Patented July 5, 1932

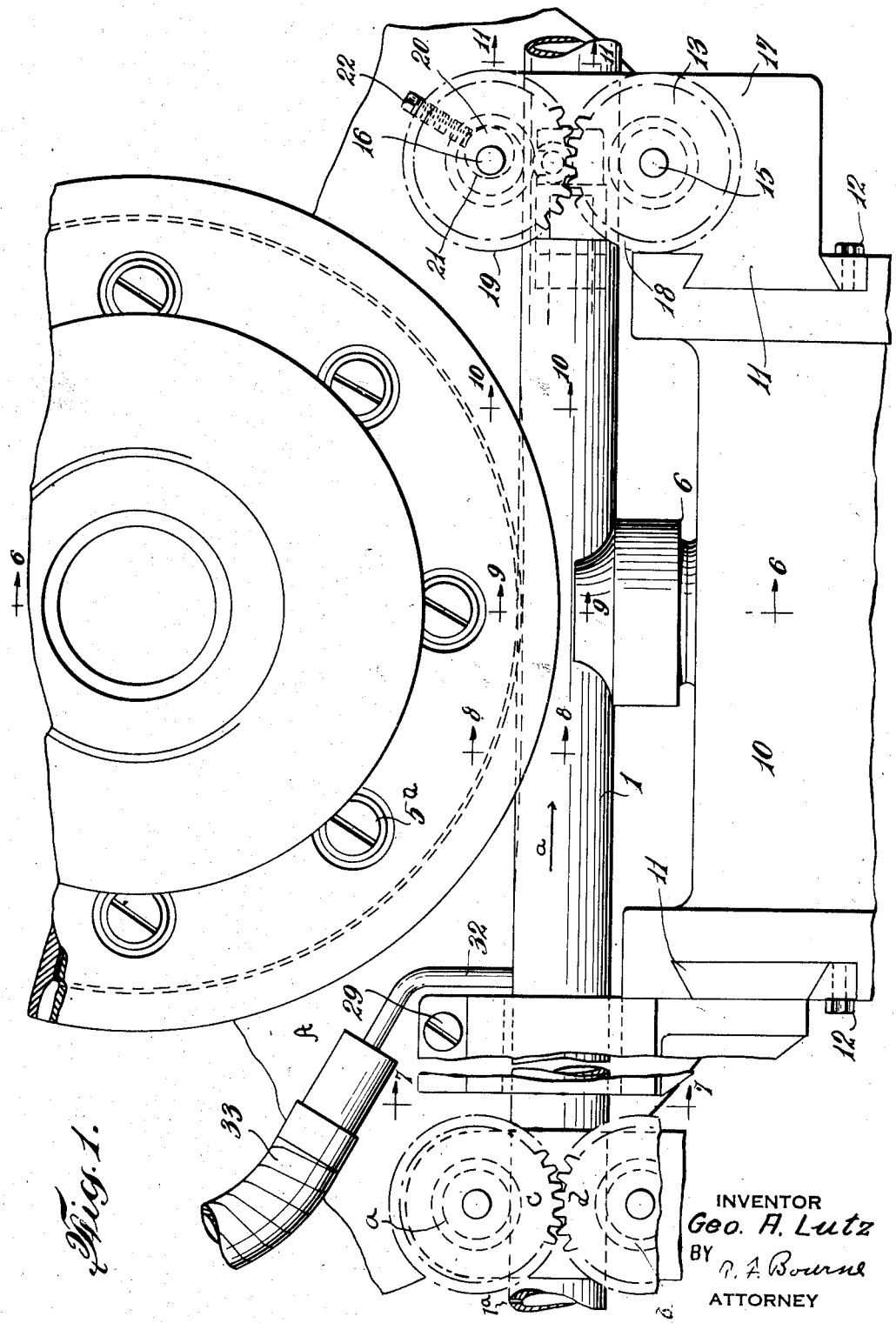

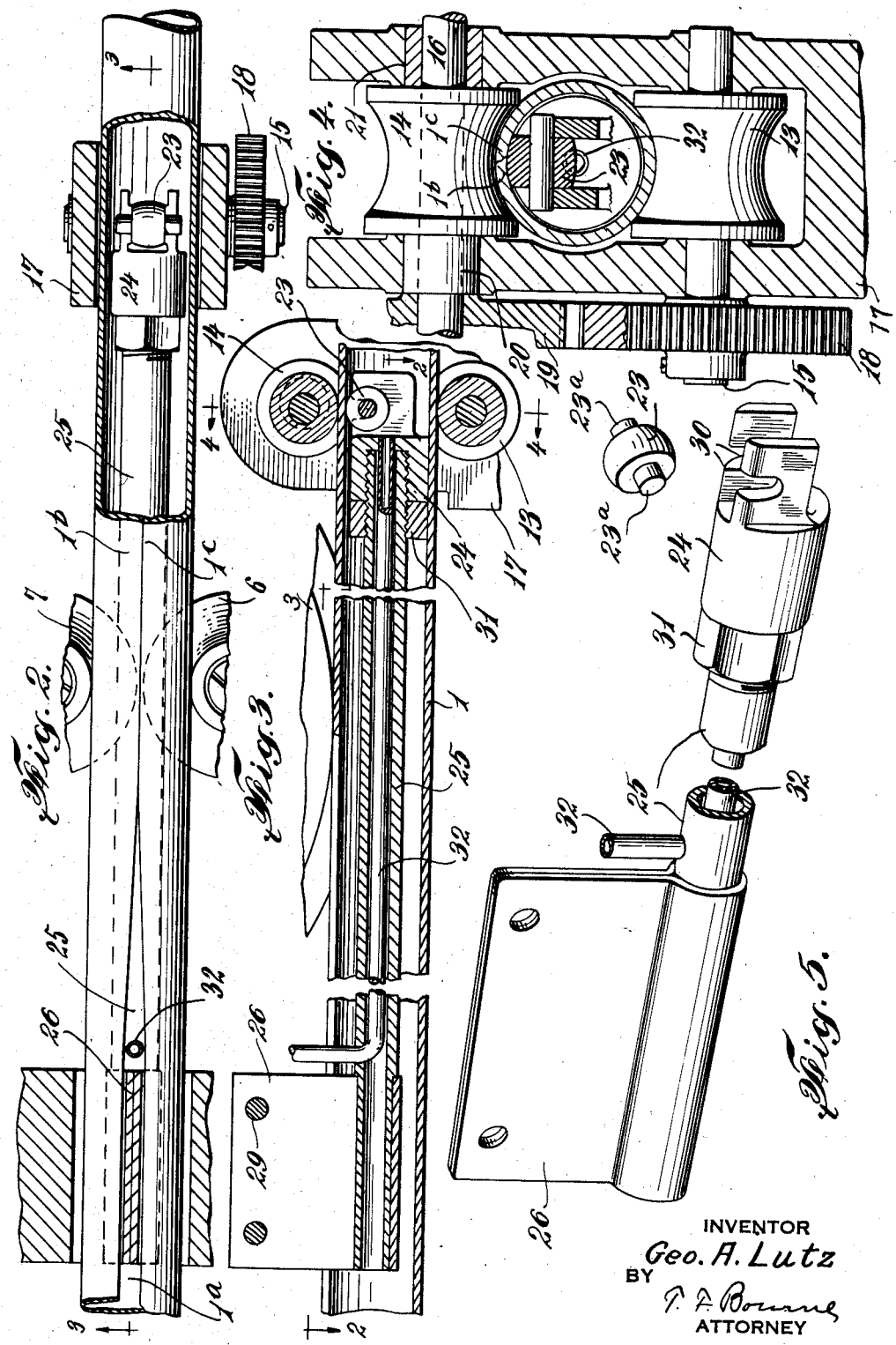

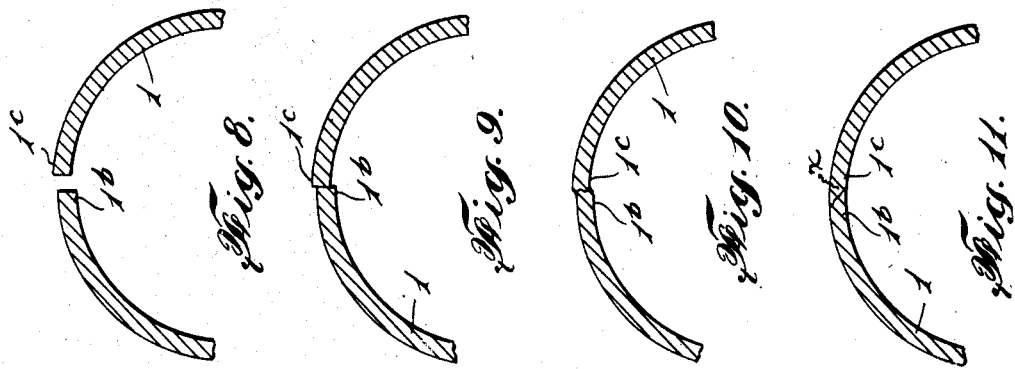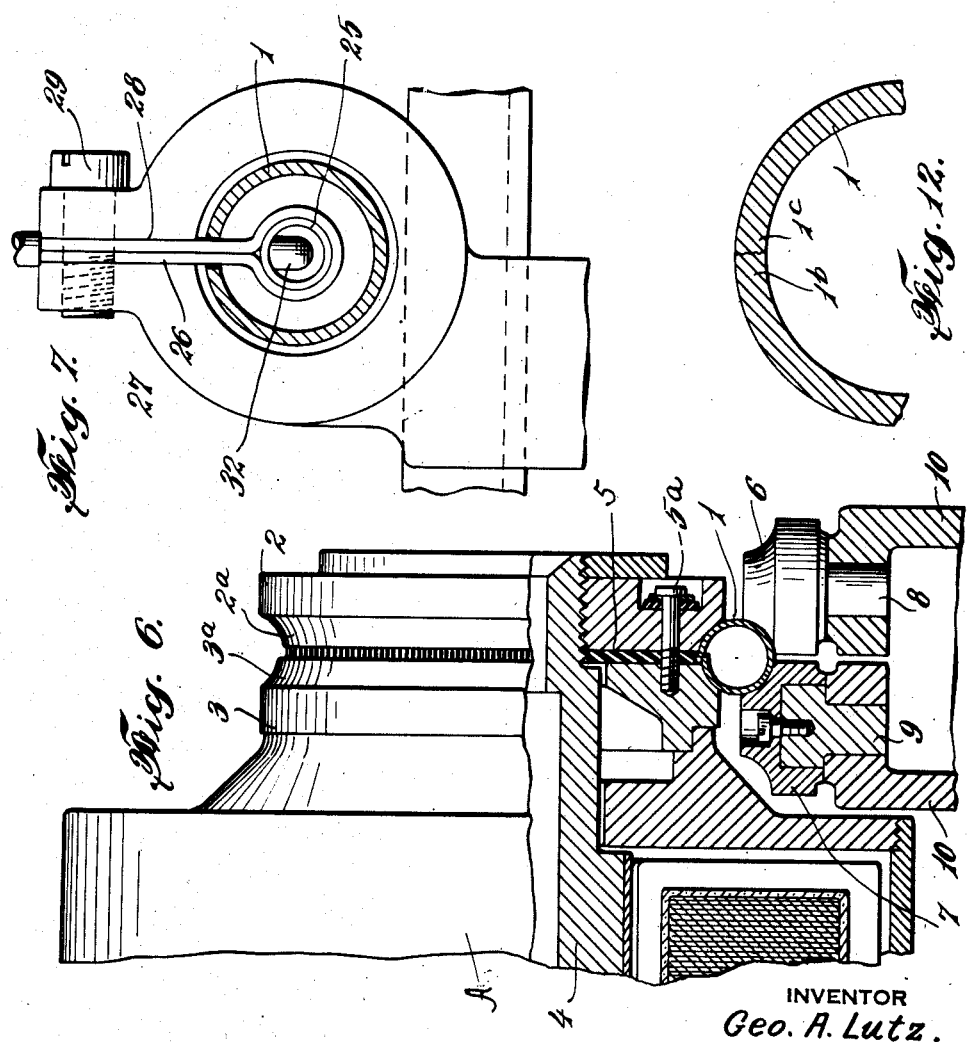

1,865,529

UNITED STATES PATENT OFFICE

GEORGE A. LUTZ, OF CRANFORD, NEW JERSEY, ASSIGNOR TO AMERICAN CIRCULAR LOOM COMPANY, INC., OF DOVER, DELAWARE, A CORPORATION OF DELAWARE

METHOD OF AND MEANS FOR WELDING

Application filed February 20, 1930. Serial No. 429,893.

My invention relates to improvements in welding together the abutting edges of metal stock and has particular reference to welding the edges of the seams in the production of metal tubes or pipes from tubular blanks.

Heretofore, so far as I am aware, in the welding of abutting edges of tubular blanks for the production of welded tubing it has been customary to register or align the abutting edges of the tubular blank in such a manner that the blank was practically circular with the outer and inner walls of the blank on opposing sides of the seam-cleft at corresponding equal distances from the axis of the blank where the heat has been applied for welding, and the edges of the blank have been pressed together to complete the weld. The heating has been accomplished for welding by means of gas flame or the flow of electric current through the metal of the blank across the seam-cleft. The pressing or forcing together of the edges of the metal at the seam-cleft at the welding place has usually resulted in the production of extrusions of the metal on the inner or the outer surfaces along the seam-cleft, or both, or, in case the speed of travel of the tube blank has been sufficiently high to avoid extrusions or burs at the seam-cleft the seam has not been completely welded throughout its length, but welding has resulted in the so called "stitch" or "recurrent weld".

Where the burs referred to are produced on the welded tubing it is customary, particularly for some purposes of use, to remove the burs, and the production of such burs on the tubing and the removal thereof from the tubing has resulted in increasing the cost of manufacture of such tubing.

An object of my invention is to butt-weld the meeting edges of metal pieces or tubular blanks in an expeditious and economical manner without the production of any appreciable burs, either on the interior or exterior of the welded seam, and to utilize a minimum of current where the metal at the seam of the blank is heated electrically.

In carrying out my invention I locate the abutting or opposing edges of the metal to be welded at a seam-cleft out of complete register one with another, in a radial direction, or in other words I cause contact of the edges with one another to an extent less than the thickness of the metal of the blank, and I force said edges into contact and heat said edges to a suitable degree for welding, traverse the tube blank in the direction of its longitudinal axis, and at a suitable distance from the place of heating the blank I move the heated edges relatively one to another in a radial direcion to cause said edges to register, or substantially so, circumferentially. With only a portion of the abutting edges at the seam-cleft in contact one with another, at the place of heating said edges, a reduction in the flow of current across the seam-cleft can be effected, (where electric welding is carried out), by reason of the reduced area of contact between the abutting edges, for the production of the required fusing heat as compared to the current flow where the abutting edges of tube blank are in complete register radially, thereby reducing the cost of welding. Furthermore, the abutting edges of the tube blank need not be pressed together at the heating place to such an extent as to cause material extrusion of the metal at said edges, and the subsequent readjustment of said edges in register to complete the welded tubing in a circular condition has the effect of producing welded tubing without burs along the welded seam, thereby obviating the cost of subsequently removing such burs.

My invention is particularly applicable for use in electric welding machines in which rotary roller contact electrodes are used for heating the tube blank at the seam-cleft. In the embodiment of my invention illustrated in the accompanying drawings I employ adjacent roller electrodes having contact surfaces of different diameters that contact with the tube blank on opposite sides of its seam-cleft, the electrode having the greater contact diameter causing the portion of the tube blank that contacts therewith to be displaced inwardly or radially a suitable distance relatively to the opposing portion of the blank, so that the contacting edges of the tube blank at the seam-cleft will be out of register. In other words, the edges of the blank will contact with one another less than the thickness of the metal at said edges. I also provide means to force said edges into contact, means to guide and traverse the tube with respect to said electrodes, and means spaced from the electrodes, operative within and without the tube blank along the seam, to push back or restore the edges at the seam to substantial register circularly while the metal at the seam is still hot enough to cause final welding of such registering edges.

My invention also comprises novel details of improvement that will be more fully hereinafter set forth and then pointed out in the claims.

Reference is to be had to the accompanying drawings herein.

Fig. 1 is side view of a portion of an electric welding machine embodying my invention and capable of carrying out my improved method;

Fig. 2 is a partly broken plan view, parts being omitted;

Fig. 3 is a detail section substantially on line 3, 3, in Fig. 2;

Fig. 4 is an enlarged cross section substantially on line 4, 4, in Fig. 3;

Fig. 5 is a detail perspective of parts shown in Fig. 3;

Fig. 6 is an edge view, partly in section, on line 6, 6, in Fig. 1;

Fig. 7 is a section on line 7, 7, in Fig. 1;

Figs. 8, 9, 10 and 11 are enlarged detail sectional views on the corresponding lines indicated in Fig. 1, illustrating steps in the production of the welded seam for the tube, and Fig. 12 is a detail section illustrating a different form of welded seam edges from that shown in Fig. 11.

Similar numerals indicate corresponding parts in the several views.

The tube blank to be welded is indicated at 1, which may be formed in any well known way from strip metal, such as steel, either in desired lengths or from continuous strips passing through the welding machine to be cut off in the desired lengths, as customary in forming blanks for welding tubes. The opposing edges of the tube blank at the open seam $1a$ are substantially in register radially or circumferentially as supplied to the welding machine, as indicated in Figs. 1 and 7.

Any desired form of welding machine equipped with my improvements may be utilized in carrying out my invention provided with means for propelling the tube blank in a longitudinal direction. I have illustrated my improvements in connection with a welding machine of the rotary transformer class, such as illustrated in Letters Patent to me #1,594,891, granted August 3, 1926, and in Letters Patent #1,478,262, issued December 18, 1923 to Snodgrass and Hunter. At A is indicated a portion of a transformer of the rotary secondary type, and at 2 and 3 are rotary annular terminal electrodes connected with the secondary 4, in a well known way. Said electrodes are suitably spaced apart and insulated from each other, as by interposed insulation 5, said electrodes being shown connected together by insulated screws at $5a$, (Figs. 1 & 6). The electrodes have suitably-curved contact surfaces at $2a$ and $3a$ to engage the tube blank 1, serving to aid in pressing the edges of the tube blank together at the seam-cleft, and to conduct electric current to the tube to cross the seam-cleft at the contacting edges in a well known way. At 6 and 7 are spaced rollers suitably journaled to rotate on vertical axes at 8 and 9 in bearings on portions 10 of the machine frame. Each of the portions 10 may be supported by guides 11 on the machine frame for lateral adjustment, to be retained in said position by screws 12, whereby the rollers 6 and 7 may be adjusted toward and from each other to properly guide and press the desired tube blank as well as to resist the pressure on the tube blank of the electrodes. Feed rollers for the tube blank are indicated at $a$ and $b$, driven by gears $c$ and $d$, in a known way. The contacting faces $2a$ and $3a$ of the electrodes 2 and 3 are of different diameter, the surface $3a$ of the electrode 3 being shown of greater diameter than the surface $2a$ of the electrode, whereby when a normally circularly disposed tube blank 1 advances into contact with the rotary electrodes 2 and 3 the electrode 2 will contact with the tube blank at its normal diameter but the contact surface $3a$ of the electrode 3, being of greater diameter than the electrode surface $2a$, will cause displacement of the corresponding edge portion of the tube blank radially inwardly to force the opposing edges at the seam-cleft out of complete register, (Fig. 6). As the tube advances toward the electrodes, in the direction of the arrow $a$ in Fig. 1, the normally spaced edges at the seam-cleft $1a$ will gradually be caused to approach and the edge portion $1b$ to be displaced or moved inwardly under the action of the electrode surface $3a$ with respect to the edge $1c$ of seam-cleft, (Fig. 8), until the seam-cleft reaches contact with the electrodes 2 and 3 where such edges will be forced into contact by reason of the pressure in the throat on the tube blank of the electrodes and the guiding and supporting rollers 6 and 7, as indicated in Figs. 6 and 9. In such position of the edges of the tube blank said edges will be out of complete register one with another, and contact of one edge with another will be less than the thickness of the metal of the tube blank at said edges, as indicated in Fig. 9.

When the edges $1b$ and $1c$ of the tube blank have been displaced radially, one with respect to another, and the current flows from one electrode through the metal of the tube blank to the other electrode across the seam-cleft the tube blank at such place will be properly heated for welding, and since the contacting area of the tube edges at the place of heating is less than the thickness of the metal of the blank increased resistance to the flow of the current will be set up, whereby a minimum flow of current, for a given gage of tube blank, may be utilized for sufficient heating of the contacting edges of the blank for the welding desired. As the tube blank traverses or moves forwardly from the heating place the heated out of register edges $1b$ and $1c$ will pass to a place where said edges are moved relatively one to another to restore said edges to register in a radial direction while the edges remain heated so that they will become welded together upon cooling.

I have illustrated means to guide the heated tube and to press the edges displaced $1b$ and $1c$ relatively one to another, whereby the edge portion $1b$ will be pushed outwardly to register with the edge $1c$ as the tube advances, as indicated in Figs. 3, 4, 10, 11, and 12. For such purposes I have illustrated spaced opposing grooved rollers 13 and 14 between which the heated tube passes, providing a throat or guideway substantially corresponding in curvature and diameter to the cylindrical form and diameter of the finished welded tube, (Fig. 4). Said rollers 13 and 14 are shown provided with shafts 15 and 16 journaled in bearings in an upright or standard 17 on the machine frame, said shafts respectively being provided with gears 18 and 19, in mesh, for causing said rollers 13 and 14 to rotate in unison in the same direction. Either of said gears may be driven by any desired source of power in a well known way for feeding or aiding in feeding the tube forwardly. One of the rollers (14) may be adjusted toward or from the other to accommodate tubes of varying diameter in any well known way. I have illustrated journal boxes 20, for shaft 16, mounted in the upright 17 in eccentrically disposed bearings 21 to be retained by screw or other fastener 22, Figs. 1 and 4. Within the tube I provide means to contact with the heated edge portions $1b$ and $1c$ of the tube blank to force the inwardly located edge portion $1b$ in an outward direction to register with the edge portion $1c$. In the example illustrated I provide a roller 23 journaled in a support 24 that is carried by an arm or bar 25 within the tube blank, said arm or bar being rigidly supported by a hanger 26 that depends through the open seam $1a$ of the tube, Figs. 3 and 7. The hanger 26 is shown secured in a bracket 27, having a split portion at 28 for clamping the hanger by means of screws 29. The roller 23 is shown provided with pivots 23$a$ operable in bearings 30 in the support 24, (Fig. 5). The support 24 is shown adjustable on the arm 25 by means of co-operating threads and a nut 31, (Fig. 3), whereby roller 23 may be adjusted in register with roller 14 for pressing the seam edges. The arm 25 is shown of tubular construction, in the bore of which is located a tube 32 which may pass from the arm and be connected outside of the arm 25 by a hose 33 with a source of water supply, the inner end of said tube being shown opening through the support 25 to deliver cooling water within the tube at and against the roller 23 for cooling the latter. The space between the rollers 14 and 23 is such as to cause the heated edges $1b$ and $1c$ of the tube to be forged together, both radially and circumferentially, for final welding of said edges together in register since the distance between the electrodes and the rollers 14 and 23 is such that the edges at the seam-cleft that have been heated adjacent to the electrodes will not become finally welded together until they have reached the rollers 14 and 23, the seam edges between said rollers and the electrodes retaining sufficient heat and remaining sufficiently fusible for final readjustment as to alignment or register and final welding at said rollers.

As the tube blank having normally registering edges advances toward the electrodes said edges are gradually forced out of register by contact of the electrode having the greater contacting diameter, and the displaced edges are forced into contact so that in the throat or pass for the tube, between the guiding rollers 6, 7, and the electrodes 2, 3, the opposing edges $1b$ and $1c$ of the tube blank will contact with one another throughout only a portion of their thickness, with the outer surface of one edge portion ($1c$) out of register with the adjacent outer surface of the other edge portion ($1b$), and with the inner surface of the edge portion $1b$ out of register with the inner surface of the edge other portion ($1c$), as illustrated in Fig. 9. In such position of the parts the current flowing between the electrodes through the seam-cleft will heat the contacting portions of the seam edges, and the non-contacting portions of the edges will be sufficiently heated for final welding, it being understood that the seam edges are not finally welded at the region or zone where the heat is applied to the tube blank. The heated portion of the tube passes to the rollers 13, 14 and 23 where the seam edges are restored to register while retained in contact by said rollers. It is only when the edges $1b$ and $1c$ of the tube blank have been restored into register at the rollers 13, 14 and 23 that the final welding of the edges occurs. The relation of the heated tube blank edges to one another and the replacement of said edges into register has the effect, at least with some gages of metal, to cause what may be termed a lap-weld to be made, that is to say the edges 1b and 1c may be forced angularly upon one another with respect to a radius through said edges in a manner illustrated diagrammatcally at x in Fig. 11, producing a very strong and substantial weld. With some other gages of metal, such as thicker gages, the welded seam may not be lap-welded, or may be lap-welded, such as illustrated in Fig. 12.

By means of my invention I am enabled to produce tubes having welded seams without causing extrusion of the metal along the seam edges, either externally or internally of the tube, (Figs. 11 and 12), obviating subsequent treatment for reduction or removal of burs, since after the non-registering seam edges have been forced back into register no burs appear externally or internally along the seam, saving the cost of the metal that has been heretofore wasted in the production of such burs and the cost of removing the latter from the tubes.

While I have illustrated and described my invention in connection with an electric welding machine for heating the edges of the tubular blank for welding, it will be understood that said edges may be heated in any other desired way, such as by means of a gas flame provided, however, that the edges 1b and 1c are out of register when heated. Said edges may be displaced by means of rollers of different diameters contacting with the tube blank, whereby the heated edges may readily be restored to register while in contact for the final welding.

Having now described my invention what I claim is:—

1. The method of welding the edges of a tubular metal blank together consisting in moving said blank longitudinally with its meeting edges out of register and in contact with one another, heating said edges while out of register one with another while the blank travels longitudinally, and moving said edges into register one with another and in contact while the blank travels and while so heated.

2. The method of welding the meeting edges of metal consisting in moving a metal blank longitudinally displacing one of the edges out of register with the other edge and causing contact of said edges together, while the blank travels, heating said edges while out of register, and moving said heated edges into register one with the other while the blank travels.

3. The method of welding the edges of metal pieces together consisting in moving a tube longitudinally having opposing edges in register, moving said edges out of complete register one with another, causing contact of portions of said edges one with another, heating said contacting portions of said edges, and restoring said edges into register while heated.

4. The method of welding opposing edges of a tubular metal blank together consisting in displacing one of said edges relatively to the other edge in a radial direction to position one edge respecting another less than the thickness of the metal, forcing portions of the edges into contact, heating said portions while in contact, and moving said edges radially one with respect to the other while heated into substantially complete register.

5. The method of welding opposing edges of a tubular metal blank together consisting in displacing one of said edges relatively to the other edge in a radial direction to position one edge respecting another less than the thickness of the metal, forcing portions of the edges into contact, heating said portions while in contact, and moving said edges radially one with respect to the other while heated into substantially complete register, and compressing said heated edges and thereby overlapping said edges at an angle to a radius through the welded seam.

6. The method of butt-welding the edges of a tubular metal blank consisting in forcing one of said edges inwardly relatively to the other edge for a distance less than the thickness of the last named edge, causing opposing portions of said edges to contact, heating said contacting portions, and forcing the inwardly disposed portion outwardly into substantially complete register with the other edge while heated, and retaining said edges in contact for welding them together.

7. The method of butt-welding the edges of a tubular metal blank at a longitudinal seam consisting in displacing one of the edges relatively to an opposing edge for a distance less than the thickness of the metal, causing contact of said edges at portions less than their thickness, forcing said portions of said edges into contact, heating them while in contact, replacing said edges into circumferential register while heated, and pressing said edges together while being replaced.

8. A tube welding apparatus comprising means to guide a tubular blank and force one edge portion of the blank out of register with the opposing portion of said blank, heating means to supply heat to the edges of the blank while out of register, and means to replace said edges into substantial register while heated.

9. An apparatus as set forth in claim 8, in which the means for forcing the edges out of register includes a pair of rollers to bear on the blank, one of said rollers having a greater diameter than the other to contact the tube.

10. An electric welding apparatus comprising means to feed a tube blank having a seam, means to guide the blank, a pair of roller contacts to engage the blank adjacent to the seam, one of said roller contacts having a surface of greater diameter to engage the tube than the contacting surface on the other roller for causing displacement of one seam portion of the tube relatively to the other seam portion, means to supply electric current to said roller contacts for heating the seam-cleft, and means to restore the seam edges into substantial register.

11. An electric welding apparatus comprising means to feed a tubular blank having a seam, a pair or rotary contact electrodes spaced apart and having surfaces to engage said blank on opposing sides of its seam, one of said surfaces being of greater diameter than the other surface for displacing one seam portion of the blank out of register with the other seam portion, means to supply electric current to the electrodes, and means to move the heated edges into substantial register and force them into contact for final welding.

12. An electric welding apparatus comprising means to guide a tube blank having longitudinal seam, means to feed the blank, a transformer having a pair of spaced rotary terminal electrodes to engage the blank on opposite sides of the seam, one of said electrodes having a contacting surface of greater diameter than the other electrode, a pair of rollers spaced from said electrodes to receive the tube seam therebetween, one of said rollers being located outside of the blank and the other roller located within the blank for pressing the portions of the blank at the seam into substantial register while heated as the blank travels between said rollers.

GEORGE A. LUTZ.